United States Patent
Liu et al.

(10) Patent No.: US 9,680,692 B2
(45) Date of Patent: Jun. 13, 2017

(54) METHOD AND SYSTEM FOR USING A RECURSIVE EVENT LISTENER ON A NODE IN HIERARCHICAL DATA STRUCTURE

(71) Applicant: Facebook, Inc., Menlo Park, CA (US)

(72) Inventors: Phillip Liu, Palo Alto, CA (US); Vishal Kathuria, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 736 days.

(21) Appl. No.: 13/748,173

(22) Filed: Jan. 23, 2013

(65) Prior Publication Data

US 2014/0207940 A1 Jul. 24, 2014

(51) Int. Cl.
 *G06F 15/16* (2006.01)
 *H04L 12/24* (2006.01)
 *H04L 29/08* (2006.01)

(52) U.S. Cl.
 CPC .......... *H04L 41/0609* (2013.01); *H04L 67/10* (2013.01)

(58) Field of Classification Search
 CPC ....................................................... H04L 67/10
 USPC .................................................. 709/224, 226
 See application file for complete search history.

(56) References Cited

U.S. PATENT DOCUMENTS

| | | | |
|---|---|---|---|
| 6,658,450 B1 | 12/2003 | Balakrishnan et al. | |
| 7,908,550 B1 * | 3/2011 | Chittu et al. | 715/234 |
| 8,005,865 B2 * | 8/2011 | Passey et al. | 707/793 |
| 8,489,742 B2 * | 7/2013 | Clubb et al. | 709/226 |
| 2010/0205220 A1 | 8/2010 | Hart et al. | |
| 2010/0306786 A1 | 12/2010 | Passey et al. | |
| 2010/0332968 A1 | 12/2010 | Squillace | |
| 2011/0137963 A1 | 6/2011 | Hoang et al. | |

OTHER PUBLICATIONS

International Search Report and Written Opinion mailed May 8, 2014, for International Patent Application No. PCT/US2014/012121 filed Jan. 17, 2014, pp. 1-9.
Extended European Search Report mailed Sep. 16, 2016 in European Patent Application No. 14743142.3, of Liu, P., et al., filed Jan. 17, 2014, 7 pages.

* cited by examiner

*Primary Examiner* — Adnan Mirza
(74) *Attorney, Agent, or Firm* — Perkins Coie LLP

(57) ABSTRACT

Disclosed is a method and system for registering a recursive watch on a node in hierarchical data structure. Embodiments of the disclosed technique may include (i) receiving a request to register an event listener on a source node, the source node being one of a plurality of nodes that are related to each other in a hierarchy; (ii) registering the event listener on the source node, the event listener configured to notify a client of an occurrence of a first event in the source node; and (iii) if the source node has a descendant node in the hierarchy, setting the event listener to notify the client of an occurrence of a second event in the descendant node without requiring registration of another event listener on the descendant node. Each of the nodes may represent, for example, a logical partition of a storage device.

18 Claims, 7 Drawing Sheets

METHOD AND SYSTEM FOR USING A RECURSIVE EVENT LISTENER ON A NODE IN HIERARCHICAL DATA STRUCTURE

FIELD OF INVENTION

This invention generally relates to an event listener in computer applications. More specifically, the invention relates to using a recursive event listener on a node in hierarchical data structure.

BACKGROUND

In computer-related technologies, an event listener is an element that detects ("listens" for) an occurrence of an event of a specified type or types in a software object (hereinafter referred to as "object") and notifies a subscriber of the occurrence of the event. In a hierarchical data structure having objects at different levels of hierarchy, to detect an occurrence of an event in any of the objects (such as creation of an object, deletion of an object, or modification of an object), current event listener techniques register an event listener on each of the objects in the hierarchical data structure. These techniques typically consume a significant amount of time and memory in registering event listeners.

Consider a scenario, for example, in which a social networking environment has 100,000 users (clients) and a server containing 100 million objects organized in a hierarchical data structure representing some user information. Assume that registering an event listener on an object consumes one bit of memory. If there are 100,000 clients, and each of the 100,000 clients wants to place an event listener on each of the 100 million objects on the server, 1.25 Terabytes of memory may be consumed just for registration of the event listeners. Three types of event listeners may be registered on an object—(a) creation of an object, (b) modification an object and (c) a child of an object. Therefore, 3.75 Terabytes of memory may be consumed just for registration of the event listeners. Further, if the client sends a separate registration request for each of the objects in the hierarchy, a significant amount network bandwidth and time may be consumed for registration. The current event listener techniques are typically inefficient, at least with respect to a consumption of time, memory and network bandwidth. Furthermore, the inefficiencies associated with current techniques of registering the event listeners may significantly scale up as the number of clients, the number of objects in the hierarchy, or both increase. In distributed system architecture, new distributed applications or services and new clients that want to consume the services may increase continuously. In such a distributed environment, the current techniques for registering event listeners would typically reduce significantly the efficiency of the whole system by consuming a significant amount of resources for registration of event listeners.

SUMMARY

What is described below is a technique for registering a recursive event listener on a node in hierarchical data structure. A recursive event listener is an event listener that listens for events that occur in a node on which the recursive event listener is registered and also listens for events that occur in the descendant nodes of the node without requiring a registration of the recursive event listener or any other event listener on the descendant nodes. The technique uses memory and processing resources more efficiently, especially in an environment having hierarchical data structure, and is not significantly adversely impacted by the number of objects being watched or the number of clients requesting for a watch.

An embodiment of the disclosed technique includes receiving a request from a client to register an event listener on a source node. The source node is one of a plurality of nodes that are related to each other in a hierarchy and each of the nodes represents a logical partition of a storage device. The server registers the event listener on the source node and the event listener is configured to notify the client of an occurrence of a first event in the source node. Further, the server determines whether the source node has a descendant node in the hierarchy and responsive to a determination that the source node has a descendant node in the hierarchy, the server sets the event listener to notify the client of an occurrence of a second event in the descendant node without requiring registration of another event listener on the descendant node.

In at least some embodiments of the disclosed technique, the client is notified, on an occurrence of at least one of the first event in the node or the second event in the descendant node, of an occurrence of at least one of the first event or the second event.

In at least some embodiments of the disclosed technique, the event listener registered on the node is persisted even after notifying, the client, of the occurrence of the first event or the second event.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed is a method and system for registering a recursive event listener on a node in hierarchical data structure. An embodiment of the disclosed technique includes receiving a request from a client to register an event listener on a source node. The source node is one of a plurality of nodes that are related to each other in a hierarchy and each of the nodes represents, for example, a logical partition of a storage device. The server registers the event listener on the source node and the event listener is configured to notify the client of an occurrence of a first event in the source node. Further, the server determines whether the source node has a descendant node in the hierarchy and responsive to a determination that the source node has a descendant node in the hierarchy, the server sets the event listener to notify the client of an occurrence of a second event in the descendant node without requiring registration of another event listener on the descendant node.

Unless otherwise noted, henceforth, the term "event listener" also means "recursive event listener." A non-recursive event listener is referred to as "non-recursive event listener."

Environment

Figure 1:
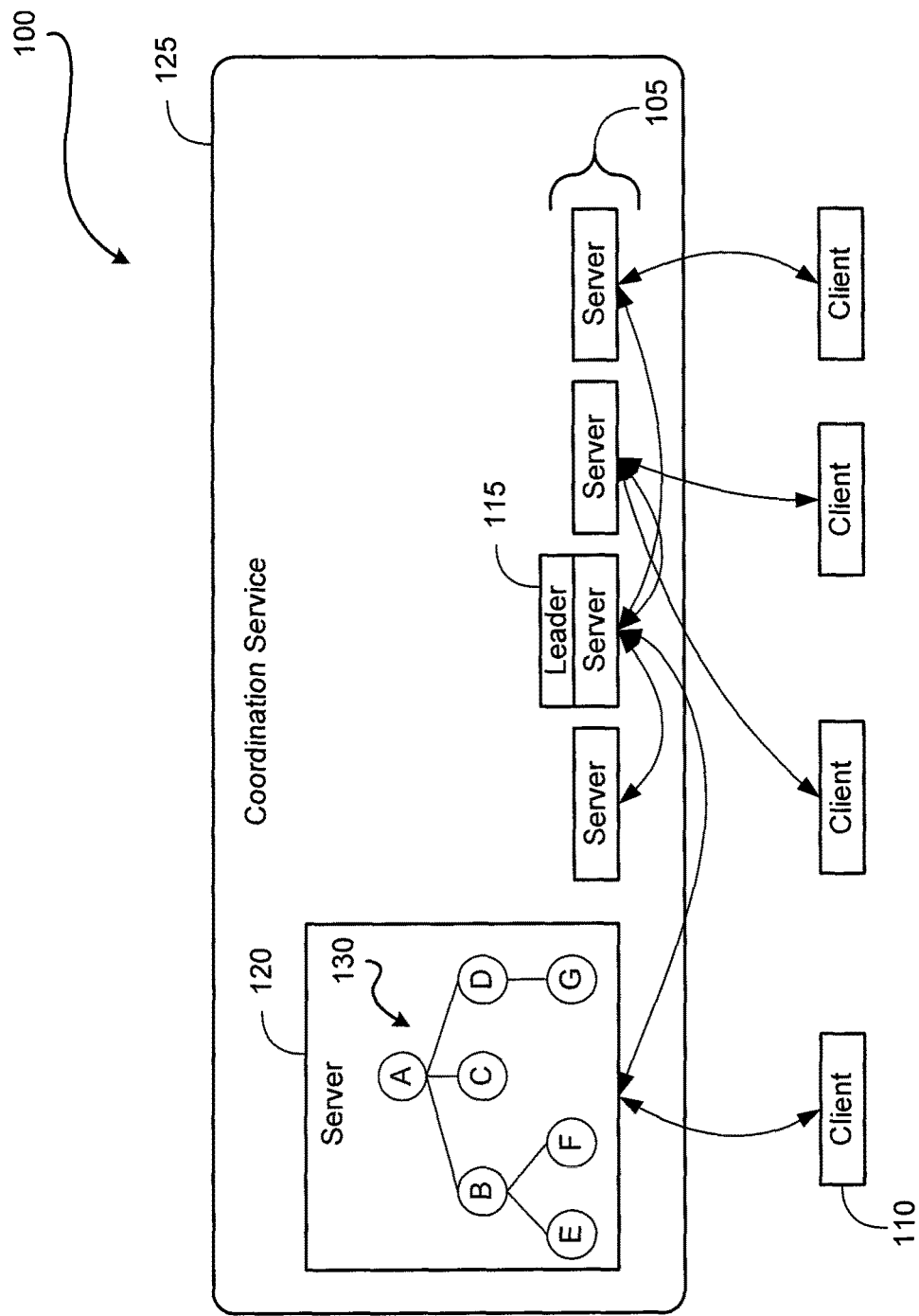
FIG. 1 illustrates an environment in which an embodiment of the invention can operate.

FIG. 1 illustrates an environment 100 in which an embodiment of the disclosed technique may operate. As shown, the environment 100 includes a coordination service 125 which can be, for example, an implementation of the ZooKeeper™ service available from Apache Software Foundation of Forest Hill, Md. In another embodiment, the environment 100 may include other similar services that provide coordination services for distributed systems or distributed applications. The coordination service 125 provides coordination services such as, for example, synchronization, configuration maintenance, groups, and naming for distributed applications. The coordination service 125 is replicated over a group of servers 105 called an ensemble. (The group 105 of servers 120 may also be referred to as "group" or "ensemble" hereafter.) As long as a majority of the servers in the group 105 are available, the coordination service 125 is available. Each server in the group 105 may have information such as, for example, a state of each other server.

In the ensemble 105, one server may act as a leader 115, whose role is to accept and coordinate transactions such as, for example, writes, via a consensus. Servers other than leader 115 in the ensemble, may act as followers which may be direct, read-only replicas of the leader 115. In the coordination service 125, some write requests from clients are forwarded to the leader 115. The followers receive proposals from the leader 115 and may agree or disagree upon serving the request from the client. Further, in the coordination service 125, if the leader 115 fails or otherwise becomes unavailable, any other follower may become a new leader, via a consensus, and may continue serving requests. The rest of the followers may be synchronized with the new leader.

The environment 100 includes a storage medium such as a database (not shown) which contains data used by the applications (not shown) using the coordination service 125. In an application such as, for example, social networking environment, the database may contain, for example, user profile data. The database is divided into a number of logical partitions, also called as "shards," each of which may contain a subset of the data in the database. For example, in a social networking application, if a database contains user profile data for 100,000 users, a first shard may contain user profile data for users 1-10,000, a second shard may contain user profile data for user 10001-20,000 and so on. Each of the shards in the database contains a separate non-overlapping subset of data in the database.

The shards in the database can be represented as a set of nodes in a hierarchical data structure such as a tree structure 130. The tree structure 130 is created in, for example, a memory of a server 120. A client 110 accesses the data in a shard of the database by accessing a corresponding node in the tree structure 130 on the server 120. A root node "A" in the tree structure 130 may represent a user database, node "B" may represent a shard having user data of users 1-10, 000, node "C" may represent a shard having user data of users 10001-20K and may node "D" may represent a shard having user data of users 20001-30K.

A client 110 may subscribe to notification of an occurrence of an event in any of the nodes in the tree structure 130. In order for a client 110 to subscribe to notification of occurrence of an event in a node, the client 110 can request the server 120 to register an event listener on the particular node. For example, a client 110 requests the server 120 to register an event listener on node A in the tree structure 130. The event listener may be either a recursive event listener or a non-recursive event listener.

A non-recursive event listener watches for events occurring only in the node on which the event listener is registered. For example, if the client 110 has registered a non-recursive event listener on node A, the client 110 will be notified of the occurrence of the event only when the event occurs only in node A. The client 110 is not notified of an event occurring in descendant nodes of node A. (In some embodiments, the client may be notified if a child of a node has changed, but may be notified one time only, for example, for the first time.) On the other hand, if the client 110 has registered a recursive event listener on node A, the client 110 will be notified of the occurrence of the event that occurs either in, node A or descendant nodes of node A in the tree structure 130. For example, if the client 110 has registered a recursive event listener on node A, the client 110 will be notified of an occurrence of the event that occurs in node A and/or any of the descendant nodes of node A, namely, nodes B-F. Similarly, if a recursive event listener is registered on node B, the client 110 will be notified of the occurrence of the event that occurs in either node B or either of its descendant nodes E and F.

Since registering a recursive event listener on a node notifies subscribers of an occurrence of an event in either the node or its descendant nodes, this technique eliminates the need for a client to register an event listener on descendant nodes of the node. This reduces the time and network bandwidth consumed for registering a non-recursive event listener on all descendant nodes. Further, the memory consumed for storing the recursive event listener registrations may also be reduced, since a single registration can be stored for watching a node and its descendant nodes. On the other hand, in non-recursive registrations there typically are as many registrations as the number of nodes the client 110 wants to watch. Accordingly, a recursive event listener allows a significant improvement in overall system performance, at least in terms of consumption of time, memory and network bandwidth, over current non-recursive event listeners in applications having hierarchical data structures.

Figure 2:
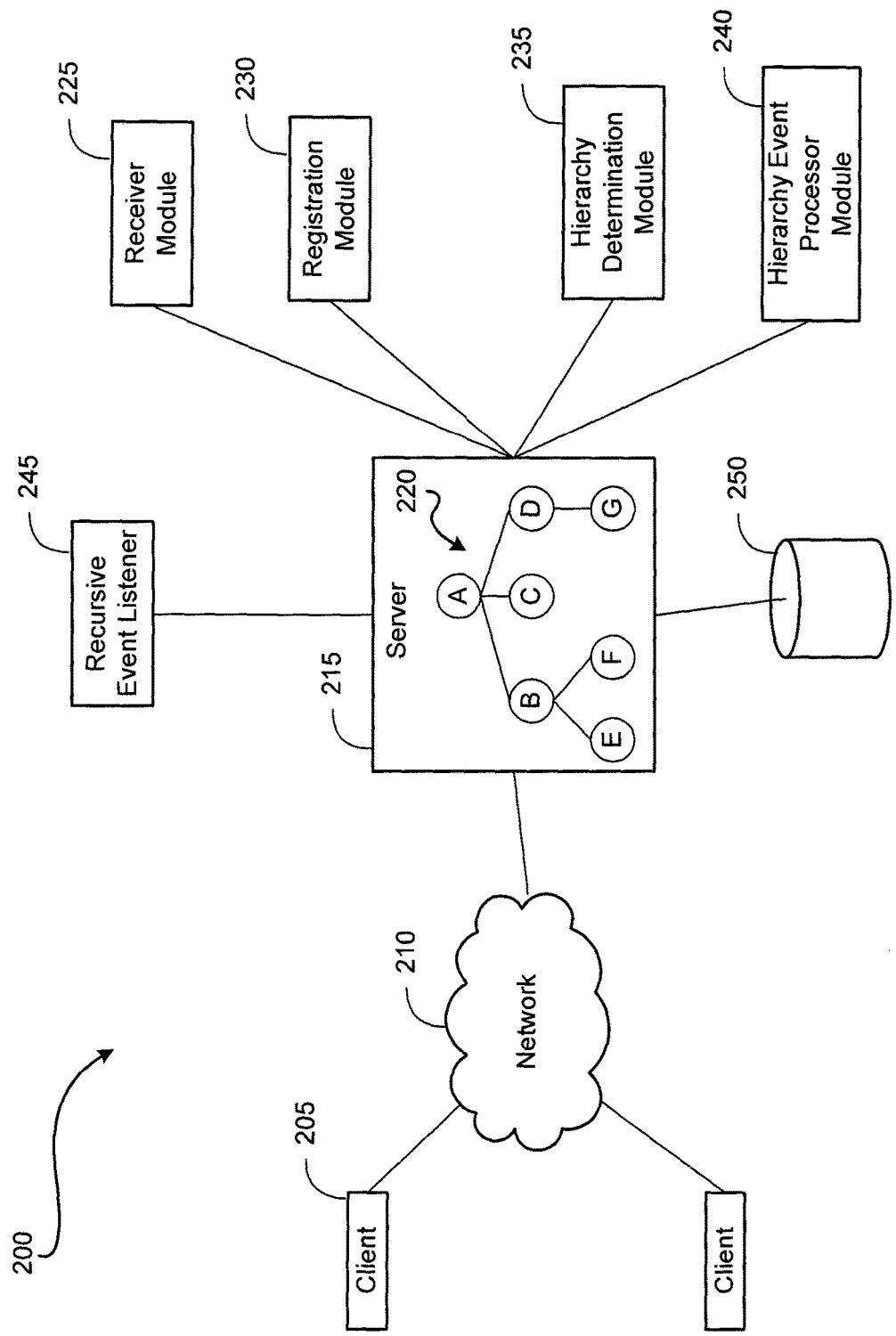
FIG. 2 is a block diagram illustrating a recursive event listener on a node in a hierarchical data structure.

FIG. 2 is a block diagram illustrating a recursive event listener on a node in a hierarchical data structure, according to an embodiment of the disclosed technique. The system 200 can be the environment 100 of FIG. 1 or a similar environment. The system 200 includes a server 215 and client 205 communicating with the server 215 over a communication network 210. The client 205 and the server 215 may run on the same physical machine or different machines. The client 205 can request registration of a recursive event listener 245 on a tree structure 220 in the server 215. For example, the client 205 requests registration of the recursive event listener 245 on node B of the tree structure 220. A receiver module 225 configured to communicate with the server 215 receives the request to register a recursive event listener 245 on node B in the tree structure 220 from the client 205.

A registration module 230 registers the recursive event listener 245 on node B in the tree structure 220. Further, the registration module 230 sets a field (for example, a bit or a set of bits) corresponding to the node B, in the memory of the server, to a predetermined value, to indicate that a recursive event listener 245 is registered on the node B. The recursive event listener 245 registered on node B notifies the client 205 of occurrence of an event in node B. After registering the recursive event listener 245 on node B, a hierarchy determination module 235 determines whether the node B has any descendant nodes in the tree structure 220. Responsive to the determination that node B has descendant nodes E and F, a hierarchy event processor module 240 sets the recursive event listener 245 registered on node B to listen to and notify an occurrence of events in nodes E or F in addition to node B. The recursive event listener 245 notifies the client 205 of an occurrence of an event in at least one of nodes B, E or F in the tree structure 220. Accordingly, the recursive event listener 245 provides an advantage of obtaining notifications of events occurring in multiple nodes while being registered on only a single node.

The types of events that can occur on a node in the tree structure 220 include creation of new node, modification of an existing node, or deletion of an existing node. The events that occur in nodes B, E, or F may be of the same type or of different types. Further, the event listener 245 is configured to notify the client of occurrence of any of the above mentioned event types.

In an embodiment, each of the nodes in the tree structure 220 represents a different logical partition of the storage unit such as a database 250. In another embodiment, at least some of the nodes in the tree structure 220 represent data contained in different logical partitions of the database 245. For example, the tree structure 220 may represent a user database having user profile data of various users in a number of shards of the database. In yet another embodiment, the nodes may represent other entities of the system 200. The tree structure 220 may be contained in a memory of the server 215.

Each of the modules, namely, receiver module 225, registration module 230, hierarchy determination module 235, and hierarchy event processor module 240, and recursive event listener 245 can run on the same machine as the server 215, or on different machines, can be integrated with the server 215, or can run in cooperation with the server 215.

The client 205 may also register a non-recursive event listener on any of the nodes A-G. In an embodiment, if an event in a node is being listened to by both a recursive event listener and a non-recursive event listener, only one notification of the occurrence of the event is sent to the client 205. For example, if the client 205 has registered a recursive event listener 245 on node B and a non-recursive event listener (not shown) on node B or its descendant nodes E and F, then, on an occurrence of the event in nodes B, E, or F, the client 205 would receive only notification regarding the occurrence of the event in any of the nodes B, E or F. The client may not receive separate notifications for the recursive event listener and the non-recursive event listener from the server.

A recursive event listener 245 registered on a node, for example, node B, is persisted even after the client 205 is notified of the occurrence of an event in the nodes B, E or F. On the other hand, a non-recursive event listener registered on a node is removed after the client 205 is notified of the occurrence of the event in the node. A non-recursive event listener has to be registered again to continue to obtain notifications of occurrences of the event from the node. A recursive event listener 245, unlike a non-recursive event listener, does not have to be registered again on the node to continue to obtain notifications of occurrences of an event on the node. Accordingly, a recursive event listener 245 is efficient, at least in terms of time and network bandwidth consumed for registration of the recursive event listener on the node, compared to the non-recursive event listeners.

Figure 3:
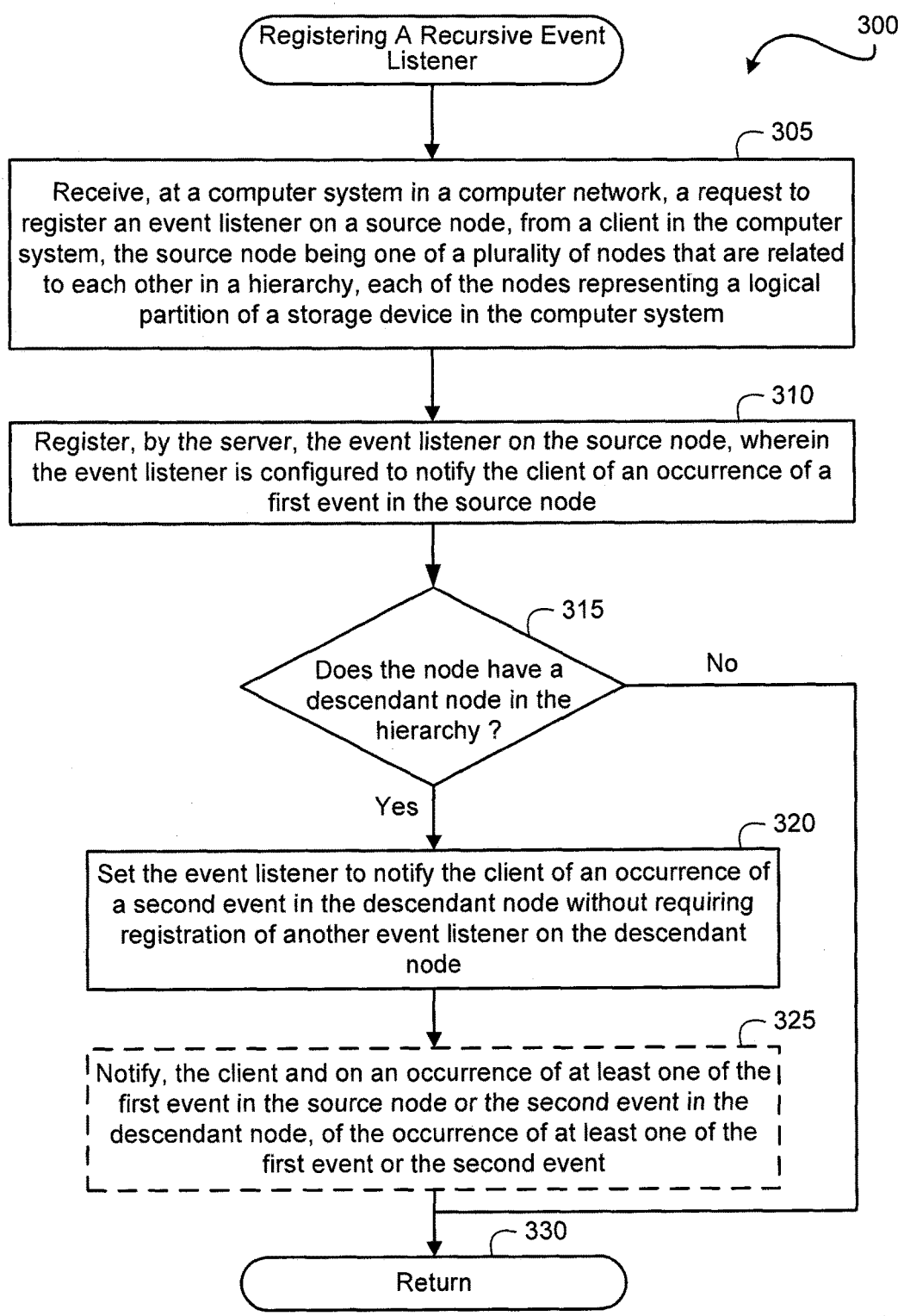
FIG. 3 is a flow diagram for registering a recursive event listener on a node in a hierarchical data structure.

Method for Registering a Recursive Event Listener on a Node in Hierarchical Data Structure FIG. 3 is a flow diagram of a process 300 for registering a recursive event listener on a node in a hierarchical data structure, according to an embodiment of the disclosed technique. The process 300 may be implemented in a system such as system 200 of FIG. 2. At step 305, a server (or a receiver module working in cooperation with the server) receives a request from a client for registering an event listener on a source node. The source node is one of a plurality of nodes that are related to each other in a hierarchy. Each of the nodes in the hierarchy represents a different logical partition of a database. At step 310, the server (or a registration module working in cooperation with the server) registers the event listener on the source node and configures the event listener to notify the client of an occurrence of a first event in the source node.

At determination step 315, the server (or a hierarchy determination module working in cooperation with the server) determines whether the source node has descendant nodes in the hierarchy. Responsive to a determination that the source node has no descendant nodes in the hierarchy, the process 300 returns at 330. On the other hand, responsive to a determination that the source node has descendant nodes in the hierarchy, at step 320, the server (or a hierarchy event processor module working in cooperation with the server) sets the event listener to notify the client of an occurrence of a second event in the descendant node, without requiring registration of another event listener on the descendant node.

On an occurrence of the first event in the source node or the second event in the descendant node, the event listener notifies the client of the occurrence of at least one of the first event or the second event as indicated by step 325.

Figure 4:
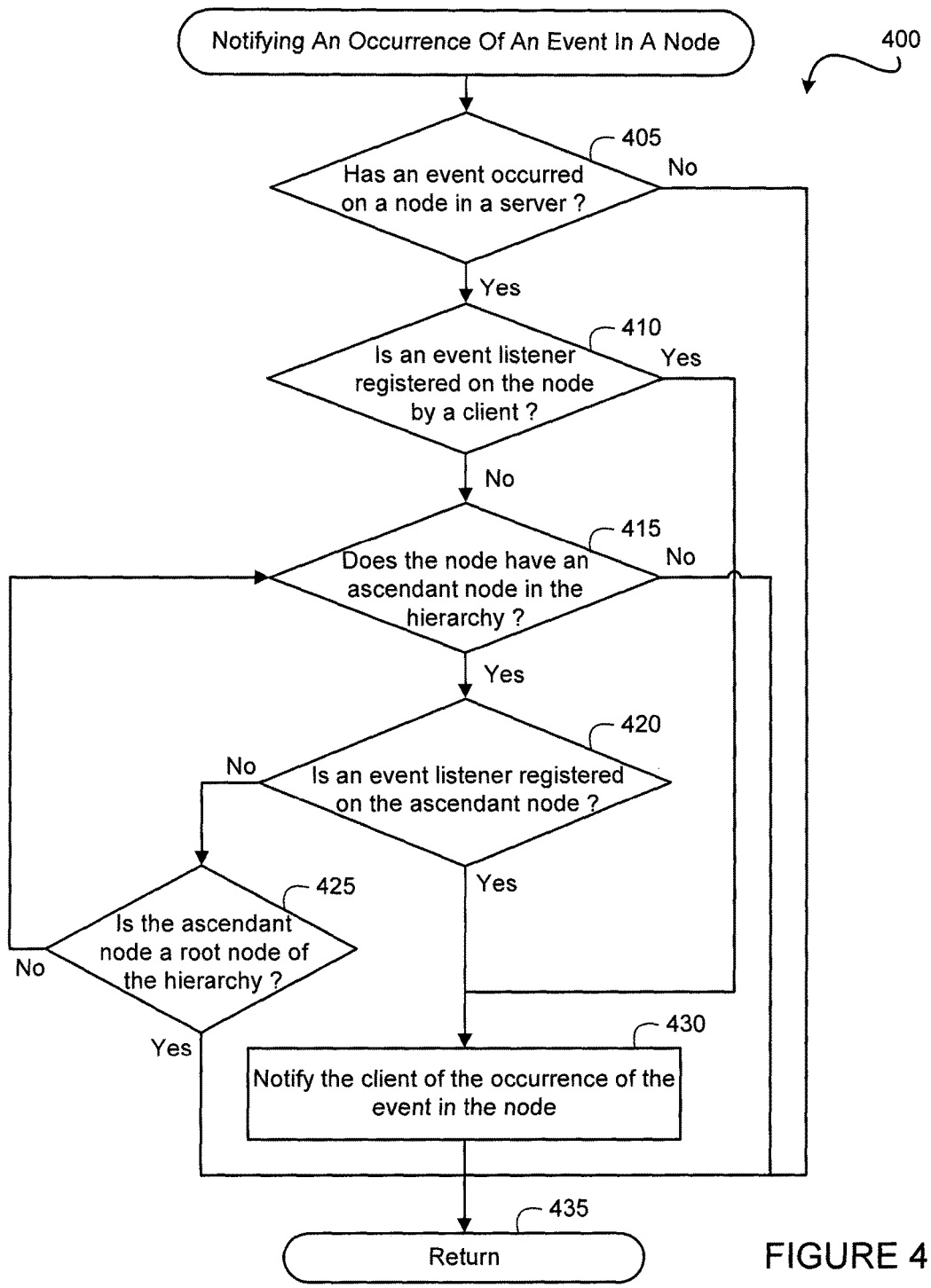
FIG. 4 is a flow diagram for notifying an occurrence if event in a node in hierarchical data structure.

FIG. 4 is a flow diagram of a process 400 for notifying an occurrence of an event in a node in hierarchical data structure, according to an embodiment of the disclosed technique. The process 400 may be implemented in a system such as system 200 of FIG. 2. At step 405, a server determines if an event has occurred on a node in the server. The node is one of a plurality of nodes that are related to each other in a hierarchy. Responsive to a determination that an event has not occurred on the node, the process returns at 435.

On the other hand, responsive to a determination that an event has occurred on the node, at determination step 410, the server determines if an event listener is registered on the node by a client. Responsive to a determination that the event listener is registered on the node, at step 430, the event listener notifies the client of the occurrence of the event on the node. On the other hand, responsive to a determination that the event listener is not registered on the node, at determination step 415, the server determines whether the node has an ascendant node in the hierarchy. Responsive to a determination that the node does not have an ascendant node in the hierarchy, the process 400 returns at 435.

On the other hand, responsive to a determination that the node does have an ascendant node in the hierarchy, at determination step 420, the server determines whether an event listener is registered on the ascendant node. Responsive to a determination that the event listener is registered on the ascendant node, at step 430, the event listener notifies the client of the occurrence of the event in the node. On the other hand, responsive to a determination that the event listener is not registered on the ascendant node, at determination step 425, the server determines whether the ascendant node is a root node of the hierarchy. Responsive to a determination that the ascendant node is not a root node of the hierarchy, the control of the process is transferred to step 415. On the other hand, responsive to a determination that the ascendant node is a root node of the hierarchy, the server realizes that no recursive event listeners are registered on the node or the ascendant node and the process 400 returns at 435.

As can be seen, a recursive event listener while registered on only one node provides the benefit of notifying of the occurrences of events in multiple nodes, namely, a node on which the recursive event listener is registered and the descendant nodes of the node.

Examples of Operation

Figure 5:
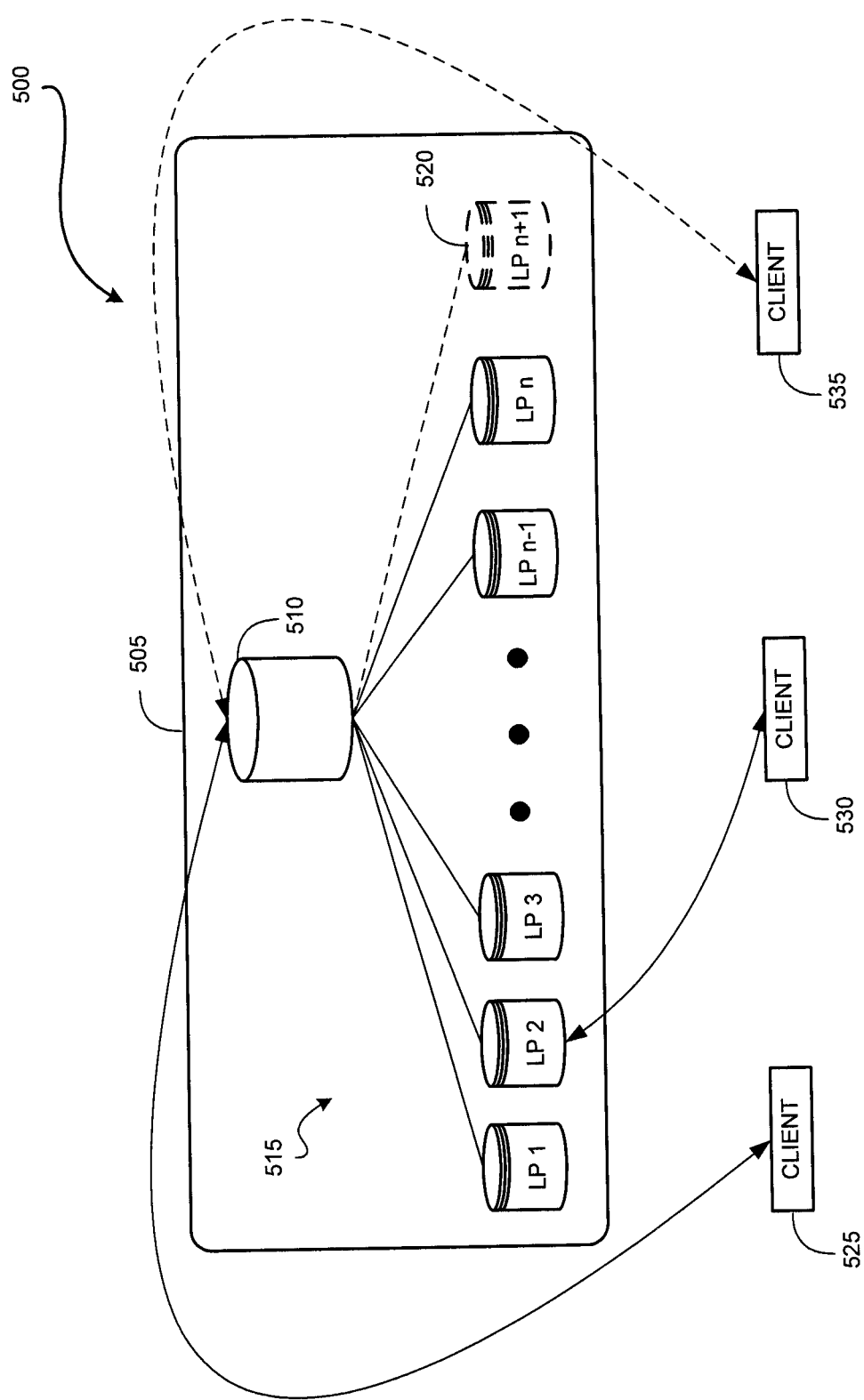
FIG. 5 provides an example illustrating registering a recursive event listener in a Coordination Service of FIG. 1.

FIG. 5 provides an example illustrating the use of a recursive event listener in a Coordination Service such as that shown in FIG. 1, according to an embodiment of the disclosed technique. The Coordination Service 500 includes a server 505 that represents user profile data, obtained from a user database 510, as a hierarchical data structure 515. The database 510 may contain data of a number of users, for example, data of users in a social networking application. The database 510 includes a number of logical partitions, namely, LP1, LP 2 and so on, until LPn. Each of the logical partitions contains data of a configurable number of users from the user database 510. In the hierarchical data structure 515, the user database 510 may be considered as a root node and the logical partitions of the user database 510 may be considered as the descendant nodes of the root node.

A client may request to register a recursive event listener, a non-recursive event listener, or both, on any of the nodes in the hierarchical data structure 515. For example, consider a scenario where the client 525 has a recursive event listener registered on the root node, user database 510, the client 530 has a recursive event listener and a non-recursive event listener registered on descendant node LP2 , and the client 535 has a non-recursive event listener registered on the root node, user database 510. All of the event listeners, that is, recursive and non-recursive event listeners, are capable of notifying the clients of an occurrence of any of various event types, such as create, delete, or modify that occurs in the hierarchical data structure 515.

Assume, for example, that the creation of a new logical partition such as $LP_{n+1}$ 520 occurs in the hierarchical data structure 515. The client 525 would be notified of the creation of the new descendant node $LP_{n+1}$ 520, since the recursive event listener of the client 525 listens for occurrence of events on the root node, user database 510 and the descendant nodes. With respect to the client 530, regardless of whether the event listener registered on the descendant node LP2 by the client 530 is recursive or non-recursive, the client 530 would not be notified of the creation of the descendant node 520, since the creation of the descendant node 520 is not an event that occurred in either node LP2 or a descendant node of node LP2. With respect to client 535, the non-recursive event listener registered on the root node 510 listens for events occurring only on node 510 and therefore, does not know of the creation of the new descendant node 520. Accordingly, the client 535 would not be notified of the occurrence of the creation of the new descendant node 520 in the hierarchical data structure.

The server 505 can provide access control features for registering recursive event listeners. For example, registration of recursive event listeners on root nodes may be restricted to a set of users or user roles, for example, administrator role or supervisor role etc. The access control features may also specify a set of users or user roles that may be allowed to (i) register recursive event listeners on any node, (ii) register recursive event listeners for a particular event type, (iii) register recursive event listeners along a particular path in a hierarchy, etc.

Further, the server may also provide filters for recursive event listeners. A filter may specify a path in hierarchical data structure along which the event listeners may be set to listen, type of events to listen to, etc. For example, in the tree structure 220 of FIG. 2, a filter may be applied to a recursive event listener registered on root node A to listen to events that occur only in the nodes along the path A-B-F. As another example, a filter can specify that only an occurrence of deletion type events is to be notified.

In some embodiments, failures such as network partition, client or server failure can cause the client to disconnect from the server. The server automatically unregisters the recursive event listener associated with that client, and the client will stop receiving the event notifications from the server. The client can try to re-register a recursive event listener on a new server and continue to receive event notifications, including the ones that occurred during the disconnection. This way the client can assume that it receives all the events occurring under a hierarchy of a given node, and that the node structure maintained by the application on the client-side match the server-side.

Without this mechanism, the client may have to retrieve the entire hierarchy after reconnection, and before registering a recursive event listener since the node structure may have changed during the failure. In at least some embodiments, each modification (for example, create, modify, delete) to the node hierarchy made in the underlying database is given a transaction number. Whenever the client reads a node from the server, it also receives a latest transaction number that modified the node. When the client tries to reconnect, it can register a recursive event listener on the node by providing a transaction number. The server tries to deliver notifications of all the events that occurred since the event corresponding to the provided transaction number occurred.

The server traverses through the node hierarchy to determine the events that need to be delivered to the client. Additionally, the server refers to history of events (for example, stored in a database as a log) in order to determine the list of deleted nodes since the deleted nodes cannot be determined from traversing the current hierarchy of the given node. In at least some embodiments, the list of events sent to the client are sorted according to associated transaction numbers.

Figure 6:
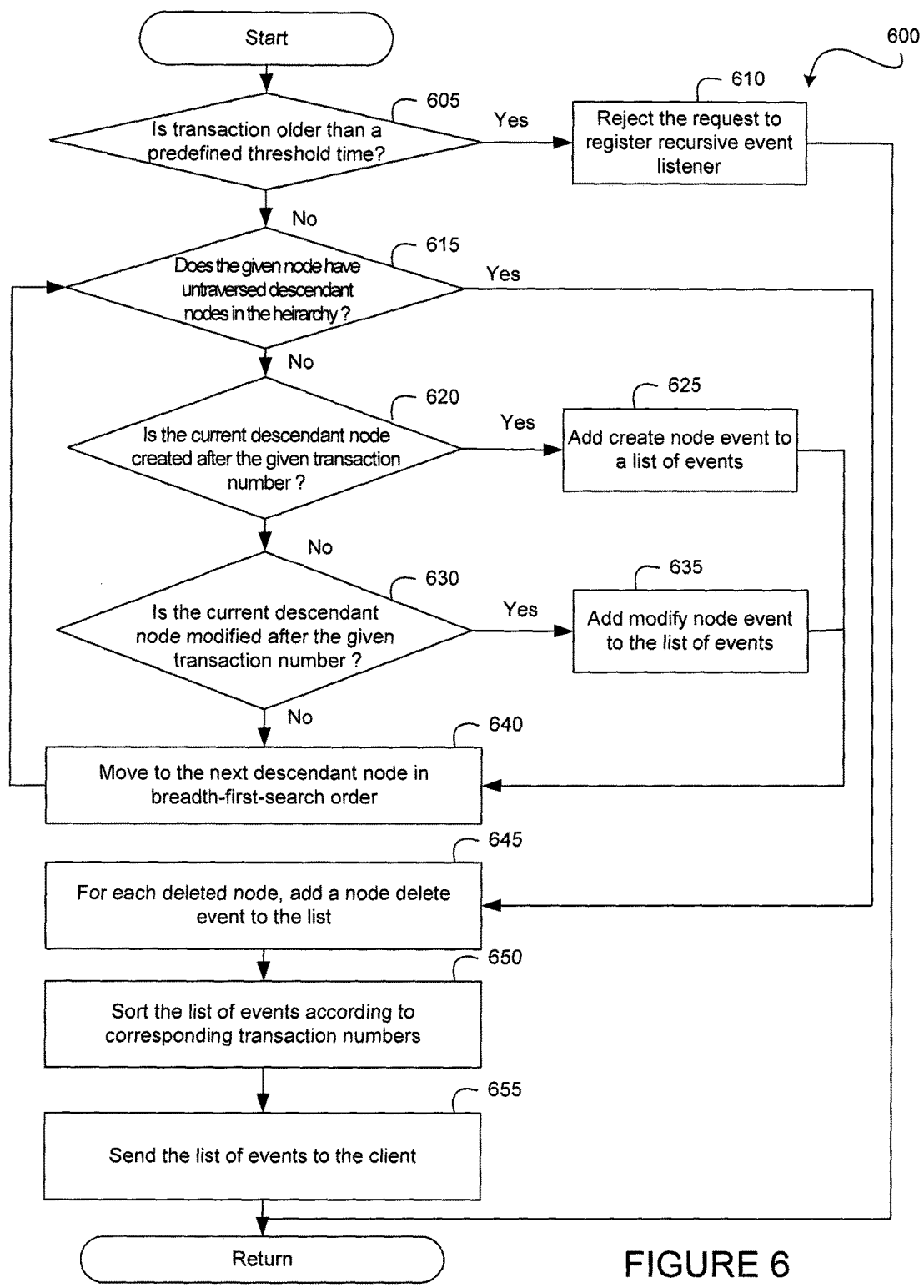
FIG. 6 is a flow diagram illustrating a process of re-registering a recursive event listener by a client in response to a communication failure between the client and a server.

FIG. 6 is a flow diagram illustrating a process 600 of re-registering a recursive event listener by a client in response to a communication failure between the client and a server, according to an embodiment of the disclosed technique. The process 600 can be executed in a system such as system 200. At determination step 605, the server determines whether a given transaction number is older than a predefined threshold time. In at least some embodiments, the server stores a history of events for certain predefined duration. If the server determines that the transaction is older than the predefined threshold time, at step 610, the server rejects the request to register a recursive event listener. In at least some embodiments, the client can retry registering by omitting the transaction number from the request.

On the other hand, if the server determines that the transaction is not older than a predefined threshold time, at determination step 615 the server determines whether the hierarchy of the given node has any unvisited nodes, that is, deleted nodes. If there are any unvisited nodes, at step 645, the server adds a delete event for each of the unvisited nodes to a list of events. In at least some embodiments, the server may determine the deleted nodes by reading the log of events (history of transactions) stored in the database. On the other hand, if the server determines that there are no deleted nodes, at determination step 620, the server determines if the current node is created after the transaction (corresponding to the given transaction number) occurred.

If the server determines that the current node is added after the transaction, at step 625, the server adds a create node event to the list, and transfers the control to step 640. On the other hand, if the server determines that the current node is not added after the transaction, at determination step 630, the server determines if the current node is modified after the transaction. If the server determines that the current node is modified after the transaction, at step 635, the server adds a modify node event to the list, and the control is transferred to step 640. At step 640, the server traverses to the next descendant node in the hierarchy. In at least some embodiments, the server traverses the hierarchy in a breadth-first search order. After the server traverses the entire hierarchy of the given node, at step 650, the server sorts the list of events according to the associated transaction numbers of the events, and, at step 655, delivers the list of events to the client.

Apparatus for Implementation

Figure 7:
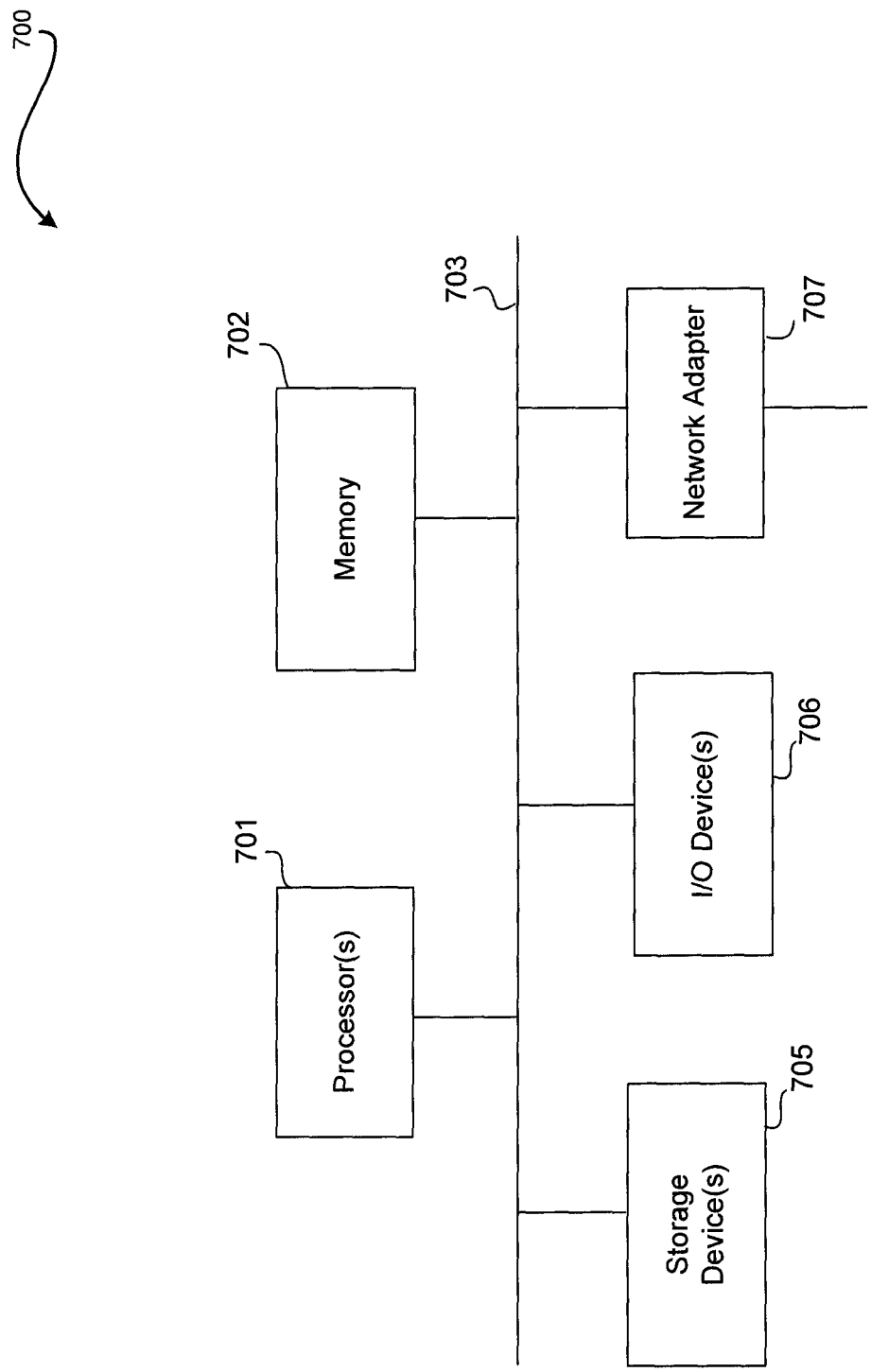
FIG. 7 is a block diagram of an apparatus that may perform various operations, and store various information generated and/or used by such operations.

FIG. 7 is a block diagram of an apparatus that can perform various operations, and store various information generated and/or used by such operations, according to the disclosed technique. The apparatus can represent any computer described herein. The computer 700 is intended to illustrate a hardware device on which any of the entities, components or services depicted in the examples of FIGS. 1-6 (and any other components described in this specification) can be implemented, such as a Coordination Service, a server, client, databases, tree structure etc. The computer 700 includes one or more processors 701 and memory 702 coupled to an interconnect 703. The interconnect 703 is shown in FIG. 7 as an abstraction that represents any one or more separate physical buses, point to point connections, or both connected by appropriate bridges, adapters, or controllers. The interconnect 703, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 701 is/are the central processing unit (CPU) of the computer 700 and, thus, control the overall operation of the computer 700. In certain embodiments, the processor(s) 701 accomplish this by executing software or firmware stored in memory 702. The processor(s) 701 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 702 is or includes the main memory of the computer 700. The memory 702 represents any form of random access memory (RAM), read-only memory (ROM), flash memory, or the like, or a combination of such devices. In use, the memory 702 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 701 through the interconnect 703 are a network adapter 707, a storage device(s) 705 and I/O device(s) 706. The network adapter 707 provides the computer 700 with the ability to communicate with remote devices, over a network and may be, for example, an Ethernet adapter or Fibre Channel adapter. The network adapter 707 may also provide the computer 700 with the ability to communicate with other computers within the cluster. In some embodiments, the computer 700 may use more than one network adapter to deal with the communications within and outside of the cluster separately.

The I/O device(s) 706 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 702 can be implemented as software and/or firmware to program the processor(s) 701 to carry out actions described above. In certain embodiments, such software or firmware may be initially provided to the computer 700 by downloading it from a remote system through the computer 700 (e.g., via network adapter 707).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 705 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state The term "logic", as used herein, can include, for example, programmable circuitry programmed with specific software and/or firmware, special-purpose hardwired circuitry, or a combination thereof.

What is claimed is:

1. A method comprising:
   receiving, at a computer system in a computer network, a request to register an event listener on a source node, from a client in the computer system, the source node being one of a plurality of nodes that are related to each other in a hierarchy, each of the nodes representing a logical partition of a storage device in the computer system, the storage device including a plurality of logical partitions, each of the logical partitions containing a separate non-overlapping subset of data contained in the storage device;
   registering, by a server in the computer system, the event listener on the source node, wherein the event listener is configured to notify the client of an occurrence of a first event in the source node;
   determining, by the server, whether the source node has a descendant node in the hierarchy; and
   responsive to a determination that the source node has a descendant node in the hierarchy, setting, by the server, the event listener to notify the client of an occurrence of a second event in the descendant node without requiring registration of another event listener on the descendant node.

2. The method of claim 1 further comprising:
   notifying, the client and on an occurrence of at least one of the first event in the source node or the second event in the descendant node, of the occurrence of at least one of the first event or the second event.

3. The method of claim 2, wherein registering the event listener on the source node includes:
   persisting the event listener even after notifying the client of the occurrence of the first event or the second event, and
   persisting the event listener until removed by the client.

4. The method of claim 2, wherein notifying the client of the occurrence of the first event or the second event includes:
   listening for an occurrence of the first event, wherein listening for the occurrence of the first event includes determining, by the server, whether a field, in a memory of the server corresponding to the source node, is set to a predetermined value indicative of a registration of the event listener on the source node,
   listening to an occurrence of the second event without requiring a determination of whether a field, in a memory of the server corresponding to the source node, is set to the predetermined value indicative of a registration of the event listener on the descendant node, and
   notifying the client of the occurrence of the first event in the source node or the occurrence of the second event in the descendant node.

5. The method of claim 1, wherein registering the event listener on the source node includes configuring the event listener to notify the client of an occurrence of a predetermined type of the first event or the second event.

6. The method of claim 5, wherein the predetermined type of the first event or the second event includes at least one of (i) creation of a new node, (ii) deletion of an existing node, or (iii) modification of the existing node.

7. The method of claim 1, wherein the first event and the second event are of a same predetermined type of event.

8. The method of claim 1, wherein the first event and the second event are of different predetermined types of event.

9. The method of claim 1, wherein setting the event listener to notify the client of the occurrence of the second event in the descendant node includes configuring the event listener to notify the client of an occurrence of an event in descendant nodes along a selected path starting from the source node in the hierarchy.

10. The method of claim 1, wherein registering the event listener on the source node includes restricting, by configuring access control, registration of the event listener on the source node to a predetermined set of user roles in the computer system.

11. A method comprising:
    determining, by a computer system in a computer network, if an event has occurred on a source node in a server of the computer system, the source node being one of a plurality of nodes that are related to each other in a hierarchy, each of the nodes representing a logical partition of a storage device in the computer system, the storage device including a plurality of logical partitions, each of the logical partitions containing a separate non-overlapping subset of data contained in the storage device; and
    responsive to a determination that the event has occurred in the source node,
      determining, by the server, if an event listener is registered on the source node by a client in the computer system,
      responsive to a determination that the event listener is registered on the source node, notifying, the client, of an occurrence of the event in the source node, and
      responsive to a determination that the event listener is not registered on the source node,
        determining, by the server, if the source node has an ascendant node in the hierarchy,
        responsive to a determination that the source node has an ascendant node in the hierarchy,
          determining, by the server, if the event listener is registered on the ascendant node, and
          responsive to a determination that the event listener registered on the ascendant node, notifying, the client, of the occurrence of the event in the source node.

12. The method of claim 11, wherein the event listener registered on the source node is persisted even after the act of notifying the client of the occurrence of the event to the client.

13. The method of claim 11, wherein the event includes at least one of (i) creation of a new node, (ii) deletion of an existing node, or (iii) modification of the existing node.

14. The method of claim 11 further comprising:
    receiving, in response to a communication failure between the server and the client, a request from the client to register a new event listener on the source node in a new server, the new server having a copy of at least a portion of the nodes in the hierarchy, and the request including a transaction number of a latest event received from the server;
    obtaining, by the new server and using the transaction number, a list of events that occurred on the source node and descendants of the source node from the time the latest event was received; and
    sending, by the new server to the client, the list of events.

15. An apparatus comprising:
a server;
a receiver module configured to cooperate with the server device to receive a request, from a client, to register an event listener on a source node, the source node being one of a plurality of nodes that are connected to each other in a hierarchy, each of the nodes representing a logical partition of a storage unit, the storage unit including a plurality of logical partitions, each of the logical partitions containing a separate non-overlapping subset of data contained in the storage unit;
a registration module configured to cooperate with receiver module to register the event listener on the source node, the event listener configured to notify, the client, of an occurrence of a first event in the source node;
a hierarchy determination module configured to cooperate with the registration module for determining whether the source node has a descendant node in the hierarchy; and
a hierarchy event processor module configured to cooperate with the hierarchy determination module to set, responsive to a determination that the source node has a descendant node in the hierarchy, the event listener to notify the client of an occurrence of a second event in the descendant node without requiring a registration of another event listener on the descendant node.

16. The apparatus of claim 15, wherein the event listener is further configured to cooperate with the registration module to notify, the client and on an occurrence of at least one of the first event in the source node or the second event in the descendant node, of the occurrence of at least one of the first event or the second event to the client.

17. The apparatus of claim 16, wherein the event listener module is further configured to:
listen to an occurrence of the first event, wherein listening to the occurrence of the first event includes determining, by the server, whether a bit, in a memory of the server corresponding to the source node, is set to a predetermined value that indicates a registration of the event listener on the source node,
listen to an occurrence of the second event without requiring a determination of whether a bit, in a memory of the server corresponding to the source node, is set to a predetermined value that indicates a registration of the event listener on the descendant node, and
notify the client of the occurrence of the first event in the source node or the occurrence of the second event in the descendant node.

18. The apparatus of claim 15, wherein the event listener is further configured to notify an occurrence of a predetermined type of an event, the predetermined type of the event including at least one of (i) creation of a new node, (ii) deletion of an existing node, or (iii) modification of the existing node.

* * * * *